United States Patent
Pawar et al.

(10) Patent No.: US 10,028,260 B1
(45) Date of Patent: Jul. 17, 2018

(54) USER EQUIPMENT RELAY STATUS REPORTING

(71) Applicant: Sprint Spectrum LP, Overland Park, KS (US)

(72) Inventors: Hemanth Pawar, Brambleton, VA (US); Pratik Kothari, Sterling, VA (US); Chunmei Liu, Great Falls, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 151 days.

(21) Appl. No.: 14/709,766

(22) Filed: May 12, 2015

(51) Int. Cl.
| | |
|---|---|
| *H04B 7/14* | (2006.01) |
| *H04W 72/04* | (2009.01) |
| *H04W 28/02* | (2009.01) |
| *H04W 74/08* | (2009.01) |
| *H04W 76/02* | (2009.01) |
| *H04W 76/14* | (2018.01) |
| *H04W 88/04* | (2009.01) |
| *H04W 92/10* | (2009.01) |

(52) U.S. Cl.
CPC ... *H04W 72/0413* (2013.01); *H04W 28/0278* (2013.01); *H04W 74/0833* (2013.01); *H04W 76/023* (2013.01); *H04W 76/14* (2018.02); *H04W 88/04* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 2010/0077100 A1* | 3/2010 | Hsu | H04W 72/1221 709/234 |
| 2011/0255492 A1* | 10/2011 | Dai | H04W 72/1284 370/329 |
| 2011/0269393 A1* | 11/2011 | Ostergaard | H04B 7/155 455/7 |
| 2012/0033606 A1* | 2/2012 | Chun | H04B 7/15528 370/315 |
| 2012/0250605 A1* | 10/2012 | Du | H04L 47/14 370/315 |
| 2012/0307668 A1* | 12/2012 | Wiemann | H04W 24/00 370/252 |
| 2013/0016649 A1 | 1/2013 | Damnjanovic et al. | |
| 2013/0021932 A1 | 1/2013 | Damnjanovic et al. | |
| 2013/0195043 A1 | 8/2013 | Chen et al. | |

(Continued)

*Primary Examiner* — Edan Orgad
*Assistant Examiner* — Sithu Ko

(57) ABSTRACT

A wireless device is configured to function as a relay on behalf of a donor access node. The wireless device requests to send a buffer status report to the donor access node. The donor access node grants this request with an allocation of air-interface resources. The wireless device responds to the grant by sending a short buffer status report. This short buffer status report is associated with a logical channel group that indicates the buffer status report is communicating the status of the wireless device as a relay, and thus is not asking for additional resource allocations. The buffer size field of the short buffer status report may also, or alternatively, be used to indicate the status of the wireless device functioning as a relay, or other information such as the number of other wireless devices being relayed by the wireless device.

20 Claims, 7 Drawing Sheets

(56) References Cited

U.S. PATENT DOCUMENTS

| | | | |
|---|---|---|---|
| 2015/0071212 A1* | 3/2015 | Kim | H04W 72/042 370/329 |
| 2015/0271860 A1* | 9/2015 | Baghel | H04W 4/08 455/426.1 |
| 2016/0183239 A1* | 6/2016 | Lee | H04W 76/023 370/329 |

* cited by examiner

USER EQUIPMENT RELAY STATUS REPORTING

TECHNICAL BACKGROUND

Wireless communication networks are widely deployed to provide communication services to both fixed and mobile devices. These services can include voice, data, video, messaging, web browsing, etc. Wireless communication has certain advantages, such as mobility, over wired communications for accessing a network. Various wireless standards have been adopted or proposed for wireless networks. These standards include 802.11 (WiFi), 802.16 (WiMAX), TIA-856 (which is also known as Evolution-Data Optimized—EV-DO), and long term evolution (LTE). Additional standards such as the fourth generation communication system (4G) are also being pursued.

Because of transmit power regulations, interference, and/or radio wave propagation characteristics, a base station may be unable to provide some wireless devices (a.k.a., user equipment—UE) with coverage and/or a desired level of service (e.g., throughput, packet loss, etc.). One approach to improving coverage and/or service, particularly to user equipment near the edge of, or outside of, a base station's direct coverage area is to relay communication between the base station and a wireless device via another wireless device. Relaying by a wireless device may also be used in crowded areas to improve coverage and/or service. Relaying in an area where there is a high number of other wireless devices is used to increase the available throughput to the wireless devices being relayed. However, a donor access node may be unaware that a particular wireless device has been configured to relay communication between the donor access node and another wireless device. Thus, the access node may not adequately service the wireless device being relayed.

OVERVIEW

In an embodiment, a method of operating a communication system includes sending a user equipment (UE) a first indicator that the user equipment has been granted an allocation to send a buffer status report (BSR). The buffer status report is received that includes a second indicator of a status corresponding to whether the UE is functioning as a relay.

In an embodiment, a communication system includes a donor access node and a processor. The donor access node is configured to establish a wireless link with a first user equipment (UE) and to communicate with a second UE via a relay by the first UE. The processor is to configure the donor access node to send, via the wireless link, a first indicator that the first UE has been granted an allocation to send a buffer status report. The processor is also to receive, from the first UE, the buffer status report that includes a second indicator of a status corresponding to whether the first UE is functioning to relay communication with the second UE.

In an embodiment, a method of operating a communication system includes establishing a first wireless link between a first user equipment (UE) and a donor access node. A second wireless link is established between a second UE and the donor access node via the first user equipment and the first wireless link. From the first UE, a buffer status report is received that includes an indicator corresponding to the first UE functioning to relay communication between the donor access node and the second UE.

DETAILED DESCRIPTION

A wireless device being serviced by an access node may be configured to relay communication between the access node and other wireless devices. Because the access node may not know that the relay wireless device is configured as a relay, the relay wireless device may not receive enough resources, or be given enough priority by the access node, to effectively improve the service and/or network conditions of the other wireless devices being relayed.

In an embodiment, when a wireless device is configured to function as a relay on behalf of a donor access node, the wireless device can request to send a buffer status report to the donor access node. The donor access node can grant this request in a conventional manner. The wireless device responds to the grant by sending a short buffer status report. This short buffer status report is associated with a logical channel group that indicates the buffer status report is communicating the status of the wireless device as a relay, and thus is not asking for additional resource allocations (like a 'conventional buffer status report would indicate.)

In other words, when a wireless device responds with a buffer status report for the 'special' logical channel group, it means that the buffer status report is not actually reporting the status of a buffer. Rather, this buffer status report indicates that the wireless device is now functioning as a relay.

Figure 1:
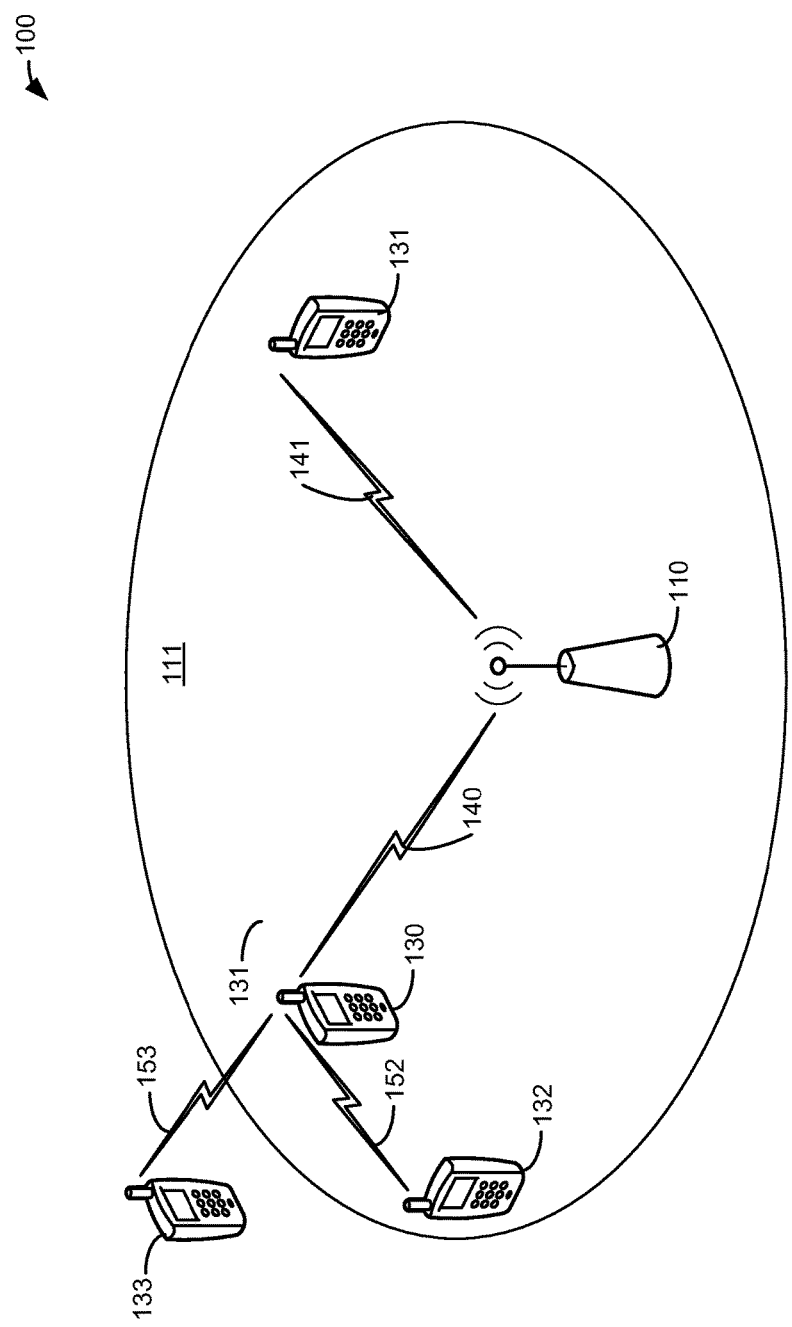
FIG. 1 is a block diagram illustrating a communication system.

FIG. 1 is a block diagram illustrating a communication system. In FIG. 1, communication system 100 comprises access node 110, wireless device 130, wireless device 131, wireless device 132, and wireless device 133. A wireless device 130-133 each may also be referred to as user equipment, or UE. Access node 110 is illustrated as having coverage area 111. Wireless device 130, wireless device 131, and wireless device 132 are located within coverage area 111. Wireless device 133 is located outside coverage area 111.

Access node 110 is illustrated as being operatively coupled to wireless device 130 via wireless link 140. Access node 110 is illustrated as being operatively coupled to wireless device 131 via wireless link 141. Thus, it should be understood that access node 110 has established direct (i.e., un-relayed) wireless links to wireless device 130 and wireless device 131. When a wireless device 130 in communication with access node 110 is acting as a relay, access node 110 may be referred to as a donor access node.

Wireless device 130 is also illustrated as being operatively coupled to wireless device 132 via wireless link 152. Wireless device 133 is also illustrated as being operatively coupled to wireless device 133 via wireless link 153. Thus, wireless device 130 is functioning as a relay for communication between access node 110 and wireless device 132. Wireless device 130 is also functioning as a relay for communication between access node 110 and wireless device 132.

Access node 110 is a network node capable of providing wireless communication to wireless device 130, wireless device 131, wireless device 132, and/or wireless device 133. Access node 110 can be, for example, one or more of a base transceiver station, a radio base station, an eNodeB device, or an enhanced eNodeB device.

Communication system 100 is a communication network that can provide wireless communication to wireless device 130, wireless device 131, wireless device 132, and/or wireless device 133. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, wireless link 141, wireless link 152, and/or wireless link 153 can be a radio frequency, microwave, infrared, or other similar signal. Wireless link 140, wireless link 141, wireless link 152, and/or wireless link 153 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from access node 110, wireless device 130, wireless device 131, wireless device 132, and/or wireless device 133, but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130, wireless device 131, wireless device 132, and/or wireless device 133 may be any device, system, combination of devices, or other such communication platform capable of communicating wirelessly with access node 110. Wireless device 130 may be any device, system, combination of devices, or other such communication platform capable of functioning as a relay with access node 110 functioning as a donor. Wireless device 132 and wireless device 133 may be any device, system, combination of devices, or other such communication platform capable of using wireless device 130 or wireless device 131 as a relay when access node 110 functioning as a donor access node.

Wireless device 130, wireless device 131, wireless device 132, and/or wireless device 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

In an embodiment, wireless device 130 and wireless device 131 can be configured to function as relays. In an embodiment, wireless device 130 and/or wireless device 131 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 110 are amplified and transmitted by the relaying device (i.e., wireless device 130 and/or wireless device 131) to the device being relayed (i.e., wireless device 132 and/or wireless device 133). Likewise, RF signals received from the device(s) being relayed (i.e., wireless device 132 and/or wireless device 133) are amplified and transmitted by the relaying device (i.e., wireless device 130 and/or wireless device 131) to access node 110.

A layer 2 relay device performs a decode and forward (DF) function. RF signals received from access node 110 are demodulated and decoded, then encoded and modulated again before being transmitted by the relaying device (i.e., wireless device 130 and/or wireless device 131) to the device being relayed (i.e., wireless device 132 and/or wireless device 133). Likewise, RF signals received from the device(s) being relayed (i.e., wireless device 132 and/or wireless device 133) are demodulated and decoded, then encoded and modulated again before being transmitted by the relaying device (i.e., wireless device 130 and/or wireless device 131) to access node 110.

A layer 3 relay device also performs a decode and forward function. However, a layer 3 relay device also performs additional processing (such as ciphering and/or data concatenation/segmentation/reassembly) In other words, the relaying device (i.e., wireless device 130 and/or wireless device 131) performs demodulation and decoding of the received RF signals (either uplink or downlink), processes received data, then encodes, modulates, and transmits the data to the device(s) being relayed (i.e., wireless device 132 and/or wireless device 133 for the downlink, and access node 110 for the uplink).

In an embodiment, wireless device 130 may be configured to function as a relay on behalf of access node 110. When (or in response to) wireless device 130 functions as a relay (e.g., for communication with wireless device 132 and/or wireless device 133), wireless device 130 sends a message to access node 110 to indicate to access node 110 (and/or communication system 100) that wireless device 130 is functioning as a relay. In this manner, because access node 110 (and/or communication system 100) now knows that wireless device 130 is functioning as a relay on behalf of access node 110, access node 110 can alter how wireless device 130 is treated.

For example, wireless device 130 may be provided with preferential treatment because it is functioning as a relay. Examples of preferential treatment can include, but are not limited to, setting one or more network parameters in order to give traffic associated with wireless device 130 better network performance than traffic associated with non-relaying wireless device 131. Network parameters may be configured to provide one or more of improved RF conditions, higher throughput, lower latency, etc. to wireless device 130 than is provided to non-relaying wireless device 131.

In an embodiment, in order for wireless device 130 to send a message to access node 110 to indicate to access node 110 (and/or communication system 100) that wireless device 130 is functioning as a relay, wireless device 130 may send access node 110 a scheduling request. This scheduling request communicates to access node 110 that wireless device 130 is asking for an allocation of air-interface resources in order to send a buffer status report. Access node 110 responds with a message that grants wireless device 130's request to send a buffer status report.

A buffer status report typically carries information on how much data is in a buffer of wireless device 130's that is waiting to be sent to access node 110. A buffer status report is associated with a logical channel group (LCG) in order to inform the access node which buffer (or group of buffers) is the subject (or subjects) of the buffer status report.

Communication system 100 may use two types of buffer status reports. One is a short buffer status report and the other is a long buffer status report. A short buffer status report is used by a wireless device 130-133 to inform access node 110 of the amount of data in an uplink buffer for one specific LCG. Thus, a short buffer status report includes an 'LCG ID' field. A long BSR buffer status report is used by a wireless device 130-133 to inform access node 110 of the amounts of data the uplink buffers for multiple (e.g., four) LCGs. Thus, a specific LCG ID field is not included in a long buffer status report. However, a long buffer status report has multiple data amount fields, each of which are associated one LCG.

To send a message to access node 110 to indicate that wireless device 130 is functioning as a relay, wireless device 130 responds to access node 110's indicator that wireless device 130 had been granted an allocation to send a buffer status report. Wireless device 130 responds by sending a buffer status report that includes an indicator of the status as to whether wireless device 130 is functioning as a relay. This indicator may be encoded into the LCG ID field of a short buffer status report. In particular, this indicator may be a particular LCG ID value that is not used for other LCGs. In other words, a 'special' LCG ID value may be associated with a 'special' or nonexistent buffer. This special LCG ID value may be used to indicate that wireless device 130 is functioning as a relay. Thus, when access node 110 receives a short buffer status report having the special LCG ID value from wireless device 130, access node 110 knows that wireless device 130 is functioning as a relay.

In an embodiment, the 'amount' (i.e., buffer size) field of a short buffer status report can communicate relay status information. For example, the amount field of a buffer status report associated with the special LCG ID can communicate whether or not wireless device 130 is functioning as a relay. In another example, the amount field of a buffer status report can indicate the number of wireless devices (e.g., wireless device 132 and wireless device 133) that wireless device 130 is relaying. In another example, the amount field of a buffer status report can indicate whether a wireless device being relayed by wireless device 130 needs to be handed off to access node 110 or another relay wireless device (e.g., wireless device 131). Other information about the status of wireless device 130's functions as a relay may also be sent via the amount field of a buffer status report.

Figure 2:
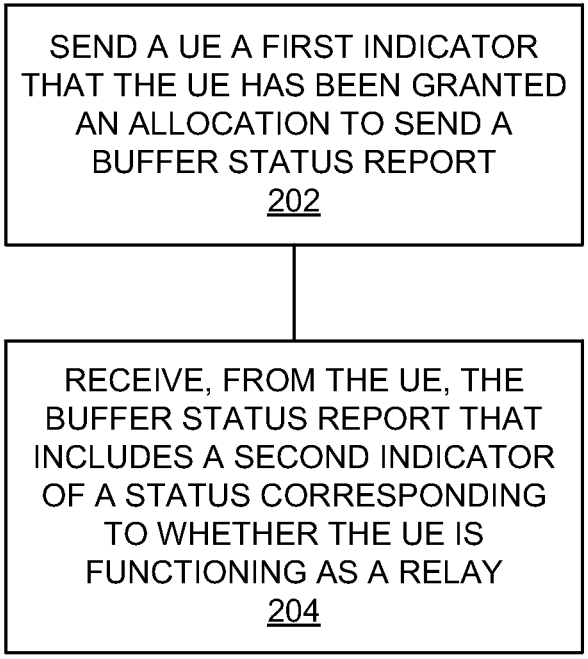
FIG. 2 is a flowchart illustrating a method of operating a communication system.

FIG. 2 is a flowchart illustrating a method of operating a communication system. The steps illustrated in FIG. 2 may be performed by one or more elements of communication system 100. A first user equipment is sent a first indicator that the user equipment has been granted an allocation to send a buffer status report (202). For example, access node 110 may send wireless device 130 a grant message that indicates wireless device 130 has been allocated uplink air-interface resources to be used to send a buffer status report to access node 110. This allocation may be in response to a request sent by wireless device 130. The request to send a BSR may have been received by access node 110 from wireless device 130 via an uplink control channel allocation. The request to send a BSR may have been received by access node 110 from wireless device 130 via a random access procedure.

From the user equipment, the buffer status report that includes a second indicator of a status corresponding to whether the user equipment is functioning as a relay is received (204). For example, access node 110 may receive a short BSR, sent by wireless device 130, that indicates whether wireless device 130 is functioning as a relay. Likewise, access node 110 may receive a short BSR, sent by wireless device 131, that indicates that wireless device 131 is not functioning as a relay.

Figure 3:
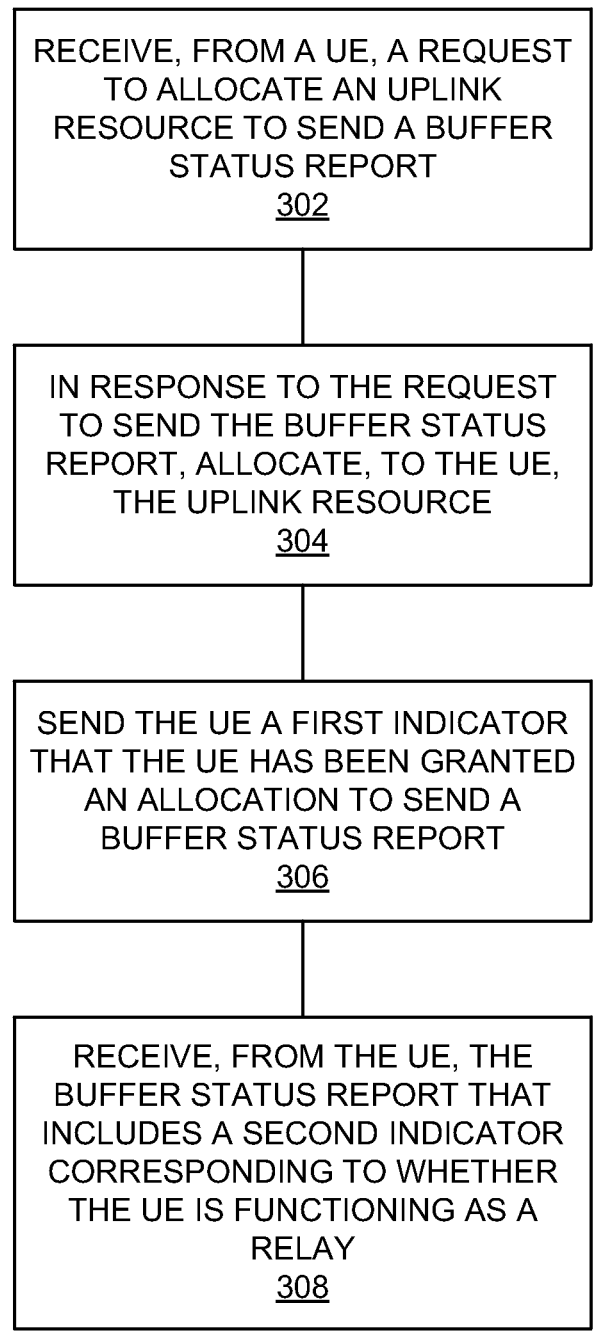
FIG. 3 is a flowchart illustrating a method of reporting user equipment relay status.

FIG. 3 is a flowchart illustrating a method of reporting user equipment relay status. The steps illustrated in FIG. 3 may be performed by one or more elements of communication system 100. From a user equipment, a request to allocate an uplink resource to send a buffer status report is received (302). For example, access node 110 may receive a scheduling request from wireless device 130. This scheduling request may have been sent by wireless device 130 in order to receive an air-interface allocation to be used to send a short BSR.

In response to the request to send the buffer status report, the uplink resource is allocated to the user equipment (304). For example, after receiving the scheduling request from wireless device 130, access node 110 may allocate air-interface resources in an upcoming uplink frame to wireless device 130. The user equipment is sent a first indicator that the user equipment has been granted an allocation to send a buffer status report (306). For example, access node 110 may send to wireless device 130 an indicator that wireless device 130's scheduling request has been granted.

From the user equipment, a buffer status report that includes a second indicator corresponding to whether the user equipment is functioning as a relay is received (308). For example, access node 110 may receive, from wireless device 130, a buffer status report that indicates whether wireless device 130 is functioning as a relay. In an example, this indicator may be encoded into the LCG ID field of a short BSR returned by wireless device 130. In another example, this indicator may be encoded or placed in the buffer size field of a short BSR.

Figure 4:
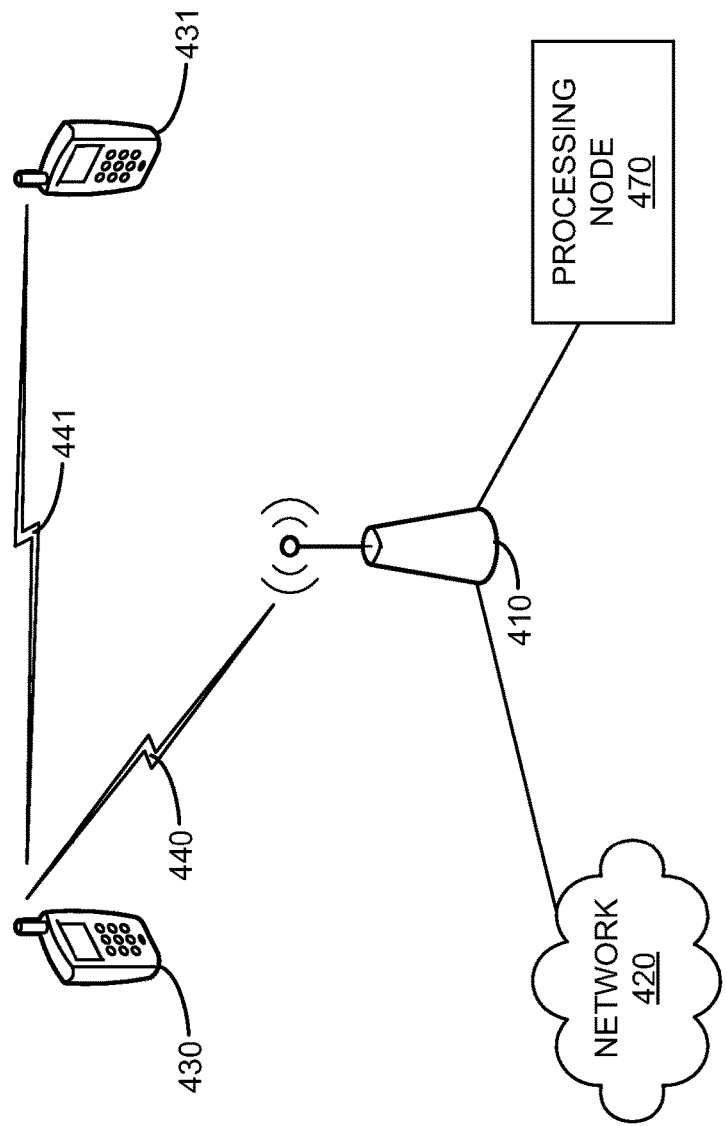
FIG. 4 is a block diagram illustrating a user equipment relay communication system.

FIG. 4 is a block diagram illustrating a user equipment relay communication system. In FIG. 4, communication system 400 comprises access node 410, network 420, wireless device 430, wireless device 431, and processing node 470. Network 420 is operatively coupled to access node 410. Processing node 470 is operatively couple to (or is a part of) access node 410. Wireless device 430 is operatively coupled to access node 410 via wireless link 440. Wireless device 431 is operatively coupled to access node 410 via wireless link 441, wireless device 430, and wireless link 440.

Wireless device 430 and wireless device 431 may be any device, system, combination of devices, or other such communication platform capable of communicating with access node 410. At least wireless device 430 is capable of functioning as a relay node for communication with access node 410. Wireless device 431 may be any device, system, combination of devices, or other such communication platform capable of communicating with access node 410 via wireless device 430 when wireless device 430 is configured as a relay on behalf of access node 410. Each of wireless devices 430-431 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 410 via wireless links. Other types of communication platforms are possible.

In an embodiment, wireless device 430 can be configured to function as a relay on behalf of access node 410. In an embodiment, wireless device 430 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 410 are amplified and transmitted by the relaying device (i.e., wireless device 430 to the device being relayed (i.e., wireless device 431). Likewise, RF signals received from the device(s) being relayed (i.e., wireless device 431) are amplified and transmitted by the relaying device (i.e., wireless device 430) to access node 410.

A layer 2 relay device performs a decode and forward (DF) function. RF signals received from access node 410 are demodulated and decoded, then encoded and modulated again before being transmitted by the relaying device (i.e., wireless device 430) to the device being relayed (i.e., wireless device 431). Likewise, RF signals received from the device(s) being relayed (i.e., wireless device 431) are demodulated and decoded, then encoded and modulated again before being transmitted by the relaying device (i.e., wireless device 430) to access node 410.

A layer 3 relay device also performs a decode and forward function. However, a layer 3 relay device also performs additional processing (such as ciphering and/or data concatenation/segmentation/reassembly). In other words, the relaying device (i.e., wireless device 430) performs demodulation and decoding of the received RF signals (either uplink or downlink), processes received data, then encodes, modulates, and transmits the data to the device(s) whose transmission is being relayed.

Access node 410 may be any wireless system that can function as a donor access node and provide communication connectivity to network 420. Examples of access nodes that may be utilized include, base transceiver stations (BTSs), radio base stations (RBSs), Node B, enhanced Node B (eNBs) and others. Access nodes may include a number of elements known to those skilled in the art comprising a transceiver, power amplifier, combiner, duplexer, antenna and control function.

Network 420 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Network 420 may also comprise a wireless network, including base stations, wireless communication nodes, telephony switches, internet routers, network gateways, computer systems, communication links, or some other type of communication equipment, and combinations thereof. Wired network protocols that may be utilized by network 420 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 410 and network 420 which are omitted for clarity, including additional processing nodes, routers, gateways, and physical and/or wireless data links for carrying data among the various network elements.

In an embodiment, wireless device 430 is configured to function as a relay on behalf of access node 410. When (or in response to) wireless device 430 functioning as a relay (e.g., so that access node 410 can communicate with wireless device 431) wireless device 430 sends a message to access node 410 to indicate to access node 410 (and/or communication system 400) that wireless device 430 is functioning as a relay. In this manner, because access node 410 (and/or communication system 400) knows that wireless device 430 is functioning as a relay on behalf of access node 410, access node 410 can alter how wireless device 430 is treated.

Wireless device 430 sends a message to access node 410 to indicate to access node 410 (and/or communication system 400) that wireless device 430 is functioning as a relay. Wireless device 430 sends access node 410 a scheduling request. This scheduling request communicates to access node 410 that wireless device 430 is asking for an allocation of air-interface resources in order to send a buffer status report to access node 110. Access node 410 responds with a message that grants wireless device 430's request to send a buffer status report.

A short buffer status report is also used by a wireless device 430 to inform access node 410 of the amount of data in an uplink buffer for one specific LCG. Thus, a short buffer status report includes an 'LCG ID' field and an 'amount' or 'buffer size' field.

Wireless device 430 responds to access node 410's indicator that wireless device 430 had been granted an allocation to send a buffer status report by sending a short buffer status report that includes an indicator of the status as to whether wireless device 430 is functioning as a relay. This indicator may be encoded into the LCG ID field of the short buffer status report. In particular, this indicator may be a particular LCG ID value that is not used for other LCGs. In other words, a 'special' LCG ID value may be associated with a 'special' or nonexistent buffer. This special LCG ID value may be used to indicate to access node 410 that wireless device 430 is functioning as a relay. Thus, in an example, when access node 410 receives a short buffer status report from wireless device 430 that has the special LCG ID value, access node 410 knows that wireless device 430 is functioning as a relay.

In an embodiment, the buffer size field of a short buffer status report can communicate relay status information. For example, the buffer size field of a buffer status report associated with the special LCG ID can communicate whether or not wireless device 430 is functioning as a relay. In another example, the buffer size field of a buffer status report can indicate the number of wireless devices that wireless device 430 is relaying. In another example, the buffer size field of a buffer status report can indicate whether a wireless device that is relayed by wireless device 430 needs to be handed off to access node 410 or another relay wireless device. Other information about the status of wireless device 430's functioning as a relay may also be sent via the buffer size field of a buffer status report.

Figure 5:
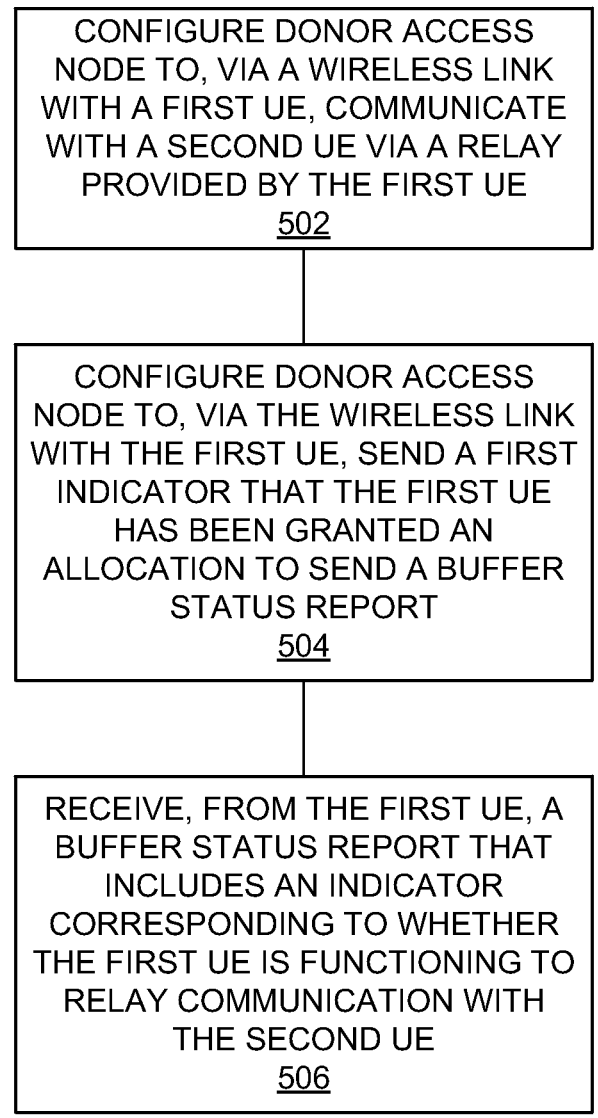
FIG. 5 is a flowchart illustrating a method of determining whether a wireless device is functioning as a relay.

FIG. 5 is a flowchart illustrating a method of determining whether a wireless device is functioning as a relay. The steps illustrated in FIG. 5 may be performed by one or more elements of communication system 100 and/or communication system 400. A donor access node is configured to, via a wireless link with a first user equipment, communicate with a second user equipment via a relay provided by the first user equipment (502). For example, access node 410 may be configured by processing node 470 to communicate with wireless device 431 via wireless link 440 as relayed by wireless device 430 over wireless link 431.

The donor access node is configured to, via the wireless link with the first user equipment, send a first indicator that the first user equipment has been granted an allocation to send a buffer status report (504). For example, access node 410 may be configured to send a grant message to wireless device 430 indicating that wireless device 430 has been granted an air-interface allocation in order to send a short buffer status report.

From the first user equipment, a buffer status report is received that includes an indicator corresponding to whether the first user equipment is functioning to relay communication with the second user equipment (506). For example, access node 410 may receive, from wireless device 430 and via wireless link 440, a short buffer status report. This short buffer status report may indicate that wireless device 430 is functioning to relay communication with wireless device 431. This short buffer status report may indicate, using the LCG ID field, that wireless device 430 is functioning to relay communication with wireless device 431. This short buffer status report may indicate that wireless device 430 is functioning to relay communication with wireless device 431 using the buffer size field.

Figure 6:
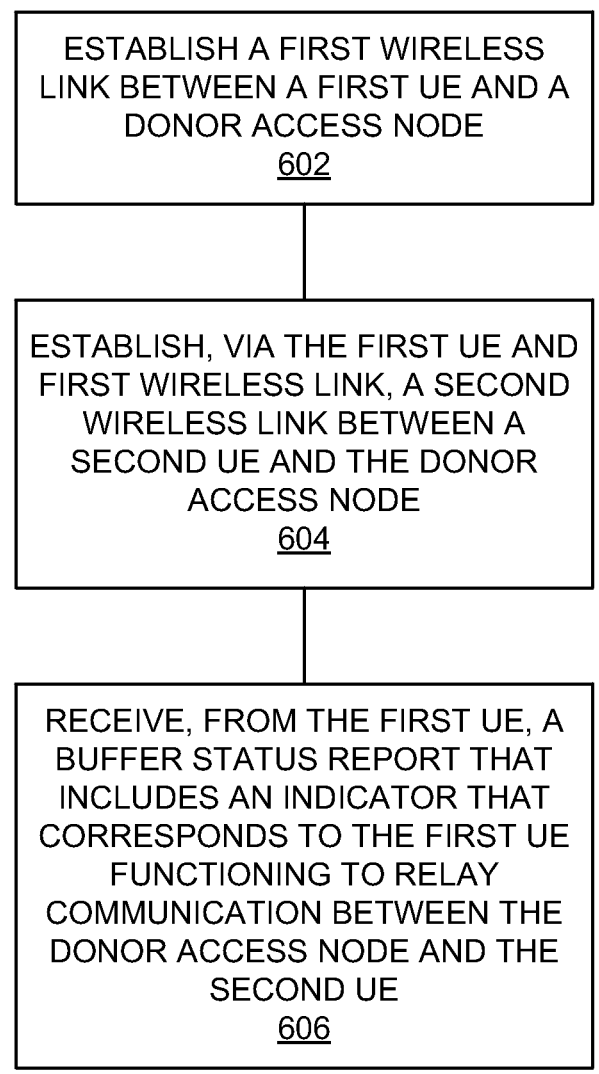
FIG. 6 is a flowchart illustrating a method of using a buffer status report to indicate relay status.

FIG. 6 is a flowchart illustrating a method of using a buffer status report to indicate relay status. The steps illustrated in FIG. 6 may be performed by one or more elements of communication system 100 and/or communication system 400. A first wireless link between a first user equipment and a donor access node is established (602). For example, wireless link 440 can be established between wireless device 430 and access node 410.

Via the first user equipment and the first wireless link, a second wireless link between a second user equipment and the donor access node is established (604). For example, a wireless link between wireless device 431 and access node 410 can be established via wireless link 441, wireless device 430, and wireless link 440. This wireless link may be established by wireless device 430 and/or wireless device 431 without access node 410 being informed that wireless device 430 is (or will be) functioning as a relay.

From the first user equipment, a buffer status report that includes an indicator that corresponds to the first user equipment functioning to relay communication between the donor access node and the second user equipment is received (606). For example, access node 410 may receive a short buffer status report having an indicator that corresponds to wireless device 430 functioning to relay communication between wireless device 431 and access node 410. This short buffer status report may indicate, using the LCG ID field, that wireless device 430 is functioning to relay communication with wireless device 431. This short buffer status report may indicate that wireless device 430 is functioning to relay communication with wireless device 431 using the buffer size field.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 400 may be, comprise, or include computers systems and/or processing nodes. This includes, but is not limited to: access node 110, wireless devices 130-133, access node 410, wireless devices 430-431, processing node 470, and/or network 420.

Figure 7:
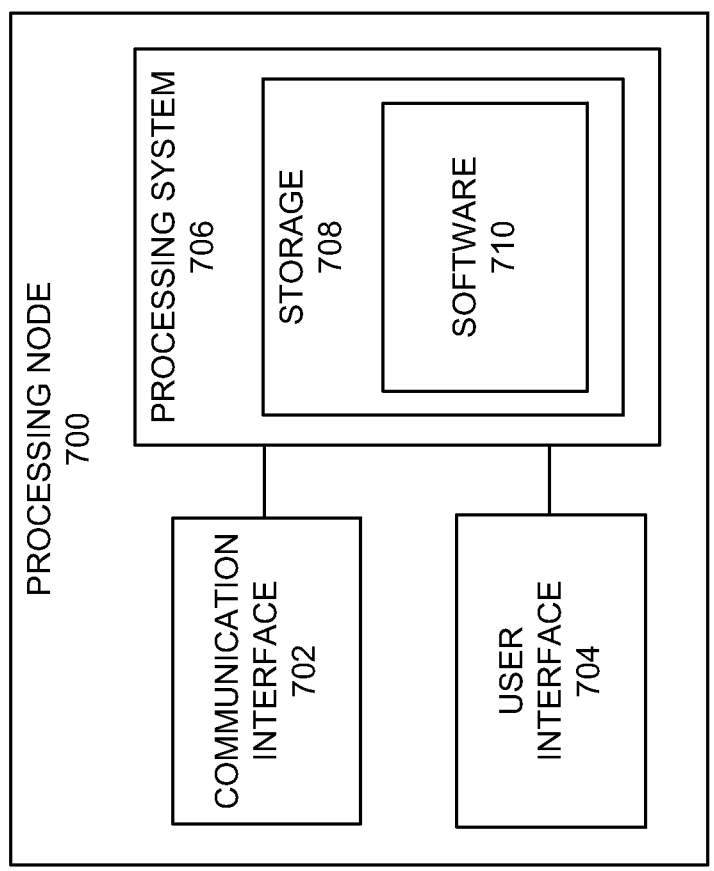
FIG. 7 illustrates a processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access node 110. Processing node 700 can also be an adjunct or component of a network element, such as an element of access node 110, wireless devices 130-133, access node 410, wireless devices 430-431, processing node 470, network 420, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    sending to a user equipment (UE) a first indicator that the user equipment has been granted an allocation to send a buffer status report; and
    receiving, from the UE, the buffer status report that includes a second indicator of a status corresponding to whether the UE is functioning as a relay,
    wherein:
    the second indicator of the status corresponding to whether the UE is functioning as a relay is encoded within a single logical channel group (LCG) field of the buffer status report,
    a size field of the buffer status report indicates that one or more additional UEs being served by the UE functioning as the relay need to be handed over to another device, and
    neither the LCG field of the buffer status report nor the size field of the buffer status report are related to an existing buffer.

2. The method of claim 1, further comprising:
    receiving, from the UE, a request to allocate the UE an uplink resource to send the buffer status report.

3. The method of claim 2, further comprising:
    allocating, to the UE, the uplink resource to send the buffer status report in response to the request that was received via an uplink control channel allocation.

4. The method of claim 2, further comprising:
    allocating, to the UE, the uplink resource to send the buffer status report in response to the request that was received via a random access procedure.

5. The method of claim 1, wherein the second indicator is sent in response to the UE changing from functioning as the relay to not functioning as the relay.

6. The method of claim 1, wherein the second indicator is sent in response to the UE changing from not functioning as the relay to functioning as the relay.

7. The method of claim 1, wherein the single LCG field corresponds to messages to indicate whether the UE is functioning as the relay.

8. The method of claim 1, wherein the buffer status report uses a short status report format that corresponds to a single logical channel group.

9. A communication system, comprising:
    a donor access node configured to establish a wireless link with a first user equipment (UE) and to communicate with a second UE via a relay by the first UE; and,
    a processor to:
    configure the donor access node to send, via the wireless link, a first indicator that the first UE has been granted an allocation to send a buffer status report; and
    receive, from the first UE, the buffer status report that includes a second indicator of a status corresponding to whether the first UE is functioning to relay communication with the second UE, wherein:
    the second indicator of the status corresponding to whether the first UE is functioning to relay communication with the second UE is encoded within a single logical channel group (LCG) field of the buffer status report,
    a size field of the buffer status report indicates that one or more additional UEs being served by the UE functioning as the relay need to be handed over to another device, and
    neither the LCG field of the buffer status report nor the size field of the buffer status report are related to an existing buffer.

10. The communication system of claim 9, wherein the donor access node receives, from the first UE and via the wireless link, a request to allocate the first UE an uplink resource to send the buffer status report.

11. The communication system of claim 10, wherein the request to allocate the first UE an uplink resource is received by the donor access node via an uplink control channel allocation.

12. The communication system of claim 10, wherein the request to allocate the first UE an uplink resource is received by the donor access node via random access procedure.

13. The communication system of claim 9, wherein the second indicator is sent by the first UE in response to the first UE changing from functioning to relay communication with the second UE to not functioning to relay communication with the second UE.

14. The communication system of claim 9, wherein the second indicator is sent by the first UE in response to the first UE changing from not functioning to relay communication with the second UE to functioning to relay communication with the second UE.

15. The communication system of claim 9, wherein the buffer status report uses a short status report format that corresponds to the single LCG field.

16. A method of operating a communication system, comprising:
    establishing a first wireless link between a first user equipment (UE) and a donor access node;

establishing a second wireless link between a second UE and the donor access node via the first user equipment and the first wireless link; and receiving, from the first UE, a buffer status report that includes a first indicator corresponding to the first UE functioning to relay communication between the donor access node and the second UE and a second indicator corresponding to one or more additional UEs for which the first UE is functioning to relay communication requiring a handover to another device, wherein:

the first indicator corresponding to the first UE is functioning to relay communication between the donor access node and the second UE is encoded within a single logical channel group (LCG) field of the buffer status report, the second indicator corresponding to the one or more additional UEs requiring the handover is encoded within a size field of the buffer status report, and neither the LCG field of the buffer status report nor the size field of the buffer status report are related to an existing buffer.

17. The method of claim 16, further comprising:
receiving, from the first UE, a request to allocate the first UE an uplink resource to be used to send the buffer status report.

18. The method of claim 17, wherein the request is received via an uplink control channel allocation.

19. The method of claim 17, wherein the request is received via a random access procedure.

20. The method of claim 16, further comprising:
disestablishing the second wireless link between a second UE and the donor access node via the first user equipment;

receiving, from the first UE, a second buffer status report that indicates the first UE is not functioning to relay communication between the donor access node and the second UE via the first UE.

* * * * *